Aug. 21, 1962 — T. P. CUNNINGHAM — 3,050,166
COUPLING DEVICES

Filed April 30, 1959 — 3 Sheets-Sheet 1

INVENTOR.
THOMAS P. CUNNINGHAM
BY
Harry G. Shapiro
ATTORNEY

Aug. 21, 1962 T. P. CUNNINGHAM 3,050,166
COUPLING DEVICES
Filed April 30, 1959 3 Sheets-Sheet 2

*INVENTOR.*
THOMAS P. CUNNINGHAM
BY
*Harry G. Shapiro*
ATTORNEY

Aug. 21, 1962 T. P. CUNNINGHAM 3,050,166
COUPLING DEVICES
Filed April 30, 1959 3 Sheets-Sheet 3

*INVENTOR.*
THOMAS P. CUNNINGHAM
BY
Harry G. Shapiro
ATTORNEY

United States Patent Office 3,050,166
Patented Aug. 21, 1962

3,050,166
COUPLING DEVICES
Thomas P. Cunningham, 272 Bergen Blvd.,
West Paterson, N.J.
Filed Apr. 30, 1959, Ser. No. 809,940
17 Claims. (Cl. 192—43)

The invention relates to improvements in screw type coupling devices, either clutches or brakes, for automatically coupling or transmitting the power of a rotating shaft to a torque-receiving member, which may be either a clutch plate connected to a driven shaft or a fixedly mounted plate to provide a brake.

It has been previously proposed, by Philips in Patent No. 1,713,712, granted May 21, 1929, to provide a screw type of one-way clutch in which a coupling member is mounted for limited rotation and axial travel with respect to a driving shaft for engagement with a coaxially arranged clutch plate. As disclosed by Philips, a spiral spring is provided to furnish resilient engagement of the coupling member with the clutch plate, and to supply a force for disengaging the parts when the rate of rotation of the driving shaft is insufficient to maintain the coupling member in engagement with the clutch plate. The spiral spring has one end thereof secured to the coupling member, and is connected at its other end to a pin slideably fitted into one end of a threaded hub. The hub, which is secured for rotation with the driving shaft, has the matingly threaded coupling member mounted thereon. In order to take-up or cushion the effect of the recoil of the spiral spring when the coupling member is disengaged from the clutch plate, a spring of another form is elsewhere located, or about the opposite end of the hub.

The present application, which is a continuation-in-part of my copending application Serial No. 423,779, filed April 16, 1954, now abandoned, is concerned with improvements in clutches (and brakes as well) of the type as above described. One of the main objects of the invention is to provide a screw type of coupling device wherein the springs are formed and related for coaction with the coupling member in a manner to afford improved distribution and more effective utilization of the resilient forces for and during the three phases of operation of the device; namely, the movement of the coupling member from its position of rest to its position of engagement with the torque-receiving clutch or brake plate, the phase during which the coupling and torque-receiving members are in engagement under constant or variable load, and the phase of return movement of the coupling member from the torque-receiving member to its neutral or position of rest. Moreover, the form of the springs, and their positional relationship within the device of the invention, enable the springs to furnish a high measure of resistance to distorting influences of a permanent nature as encountered under conditions of substantial overload upon the device for extended periods of time. Also, at high rates of rotation, where the effects of centrifugal force are considerable, the form and arrangement of the springs with relation to the coacting parts permit maximum operating effectiveness. The device will not freeze or lock-up under these severe operating conditions.

Another object of the invention is to provide a coupling device of the type under consideration which, in addition to possessing the improved operating characteristics outlined above, is compactly constructed. All the springs are protectively housed within a single chamber. Both the interconnecting spring means acting to effect disengagement of the coupling and torque-receiving members and the spring means to cushion and overcome the tendency of the coupling member to override upon recoil of the interconnecting spring means are located in the same comparatively small area.

A further object of the invention is to structurally relate the spring means with respect to the coupling member so that the same spring may function both to interconnect the driving shaft and the coupling member for the resilient engagement and disengagement of the coupling member with respect to the torque-receiving member and to cushion the return travel of the coupling member from its position of engagement with the torque-receiving member.

Still another object of the invention is to provide a screw type of two-way coupling device.

Still a further object of the invention is to provide a screw type of two-way coupling device which requires only a minimum number of operating parts to obtain the highly desirable two-way operation.

Another object of the invention is to provide a two-way screw type of coupling device which includes a pair of springs which are so arranged that, depending upon the direction of rotation of the driving shaft, the springs will selectively function as either resilient interconnecting means, or as cushioning means to offset the effect of the interconnecting means upon recoil. In addition, a resilient interconnecting force may be derived additively from both springs.

Still a further object of the invention is to provide a two-way operable coupling device in which the parts thereof are arranged in essentially the same relationship as for a unidirectional coupling device, thereby simplifying and standardizing the essential assembly operations for the manufacture of both types of devices.

Still another object of the invention is to provide coupling devices of the type under consideration which utilize essentially the same component parts for either the one-way or two-way operability thereby necessitating the fabrication of a minimum number of parts, and furnishing economy from the standpoint of a minimum inventory of manufactured parts.

These, and other objects and advantages of the invention will be apparent from the following detailed description, taken in conjunction with the drawings illustrating several preferred embodiments of the invention, in which.

Figure 8:
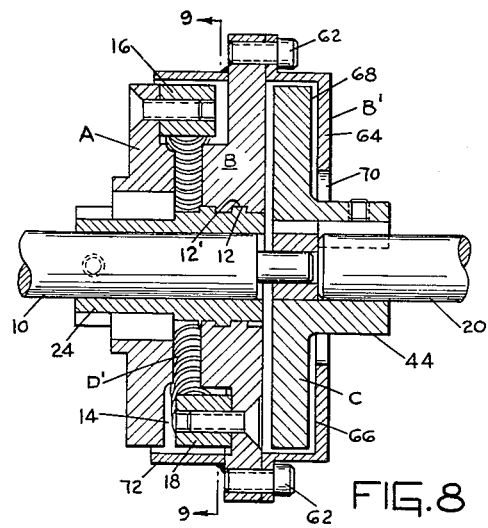
FIG. 8 is a vertical cross-sectional view illustrating an embodiment of a two-way clutch, this view showing the clutch in its neutral or disengaged position.
Figure 9:
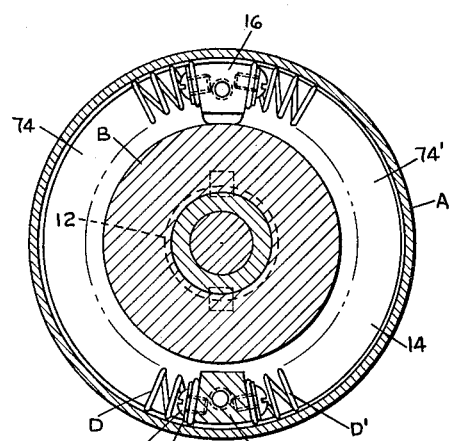
FIG. 9 is a view taken approximately in the plane of line 9—9 of FIG. 8.
Figure 11:
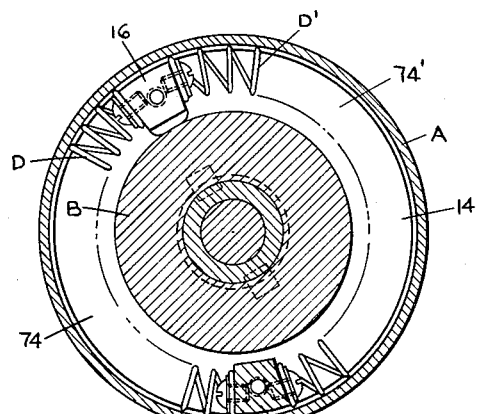
FIG. 11 is a view taken approximately in the plane of line 11—11 of FIG. 10.
Figure 13:
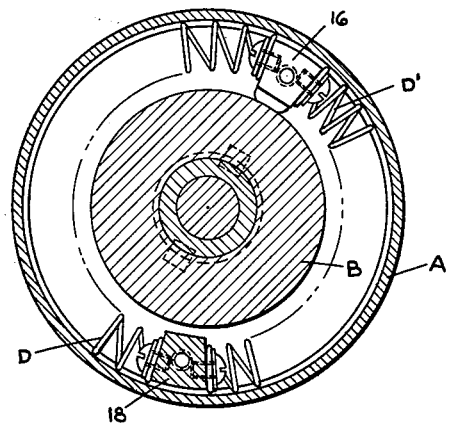
FIG. 13 is a view taken approximately in the plane of line 13—13 of FIG. 12.
Figure 14:
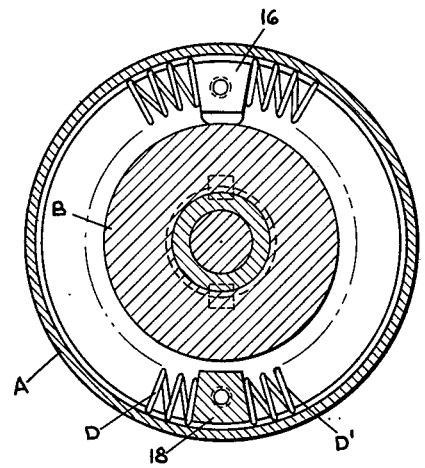
Figure 15:
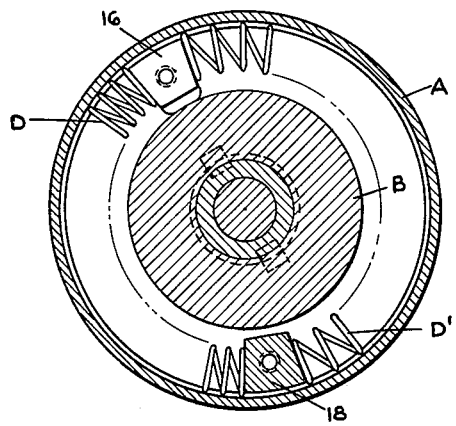
Figure 17:
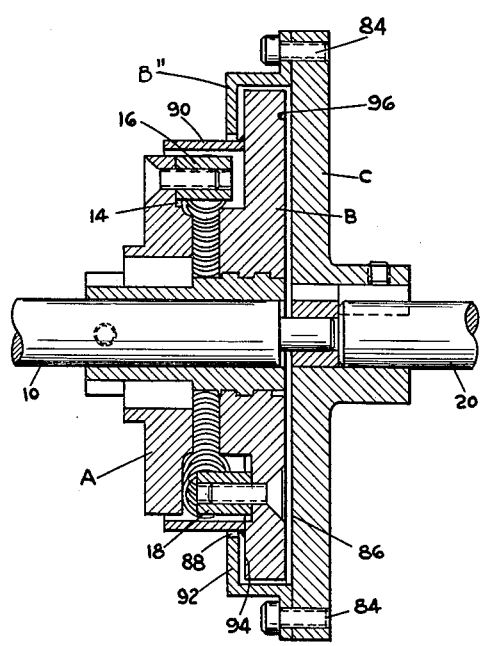
Figure 16:
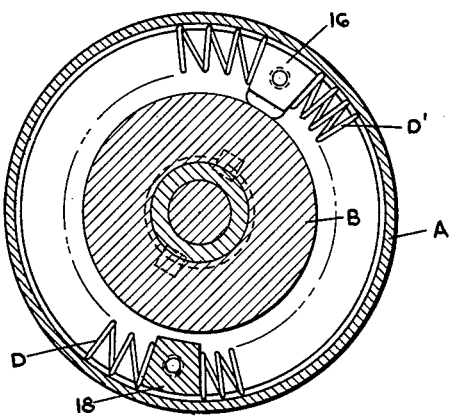

FIGS. 14, 15 and 16, which correspond respectively to FIGS. 9, 11 and 13, illustrate another relationship of the springs with respect to the abutments provided by the driving and coupling members when the clutch is in disengaged position, and in engaged positions upon respectively opposite directions of rotation of the driving shaft; and FIG. 17 is a view similar to FIG. 8, this showing however, illustrating another arrangement for providing a secondary torque-receiving element for a two-way operating coupling device.

As shown in the drawings, coupling devices made in accordance with the invention generally, and in common with the several illustrated and preferred embodiments of the invention, comprise a driving member A adapted to be secured to a driving shaft 10 for rotation therewith. The driving member, or the driving shaft, is provided with externally threaded means 12 fixed for rotation therewith. The threaded means extends circumferentially around the central longitudinal axis of the device on a diameter less than the diameter of the driving member, and may surround the driving shaft 10. Also, such threaded means extends axially or longitudinally of the driving member and of the shaft. A pressure plate or coupling member B having mating internally threaded means 12' is mounted on the threaded means 12 so that the coupling member is adjacent and in parallel relationship with respect to the driving member. Either the driving member or the coupling member, or both, are formed to provide an annular chamber 14 between the members. The annular chamber surrounds the matingly threaded portions 12, 12' in radially spaced relation.

The driving and coupling members are provided with oppositely extending abutments which extend axially from the respective members into the annular chamber 14. The driving member is provided with one or more abutments 16, and the coupling member with one or more abutments 18. The abutments, which are located on substantially the same diameter with respect to the central longitudinal axis of the device, are situated outward radially with respect to the mating threaded means 12, 12', with an abutment of the driving member circumferentially off-set with respect to an abutment of the coupling member.

A pair of substantially constant diameter, helically coiled springs D are positioned in the annular chamber 14, with the ends of each spring respectively arranged for engagement with an abutment of each of the driving and coupling members. The springs are positioned in the chamber to lie on substantially the same diameter in a single plane which is concentric and parallel to the plane of the threaded means 12, 12'.

A torque-receiving member C is positioned in axial alignment with the coupling member B and spaced therefrom a slight distance for engagement by the coupling member. The torque-receiving member may be in the form of a stationary, fixedly supported brake plate or, as illustrated, a rotatably mounted clutch plate may be provided and formed to receive a shaft 20 to be driven.

The number of springs, preferably two or more, which are used for coaction with the driving and coupling members in the relationship as above described, is a matter of selection, depending upon the requirements of a particular application for the coupling device. Where an application involves the transmission of loads of substantial amount under normal operating conditions, and therefore requires a coupling device of comparatively large size, it is preferred to distribute the resilient forces to an increased number of springs. At least one of the helically coiled springs functions to interconnect the coupling member with the driving member, and the driving shaft, so that upon rotation of the driving shaft, and the relative rotation between the driving and coupling members and axial travel of the latter, the spring will be stressed between an abutment of a driving member and an abutment of a coupling member. The second or additional springs serve several purposes, particularly as a result of its or their positional relationship with respect to the first or other springs. The second spring also may function to interconnect the coupling member with the driving shaft, whereupon it serves both to supply its resilient force, additively, to that of the first spring and to furnish a dynamically balanced relationship of the parts by virtue of the symmetry permitted in the positioning thereof with respect to the first spring. The second spring may also be arranged to function as a cushioning spring whereupon, as will subsequently appear in the detailed description, it may alternately act to interconnect the coupling member to the driving shaft in a two-way operable coupling device, in addition to functioning as a cushioning spring and to furnish a dynamic balance of the coacting parts. Although not as desirable from the standpoint of the advantages afforded by a plurality of springs, the form of spring used, in a relationship to be described, permits the use of but a single spring to provide improvements over prior art screw-type coupling devices.

By arranging the helically coiled springs to exert their respective forces in the same single plane in a direction parallel and concentric to the plane of the threaded means, the pressure transmitted to and exerted upon the threaded portions of the device is such that thread distortion is minimized, and possible lock-up of the device under heavy overload is prevented. Such concentric and parallel arrangement results in the application of the forces uniformly to the coupling member in all phases of operation of the device; as the coupling member is rotated and axially displaced toward the torque-receiving member, during its resilient engagement with the torque-receiving member, under variable as well as constant load, and as the coupling member is released or retracted from the torque-receiving member toward neutral position. Also, at extremely high rates of rotation, where the effects of centrifugal force upon the parts, and upon the springs in particular, is of substantial magnitude, the described form, disposition and relationship of the springs with its coacting parts results in such force being uniformly distributed with a minimum of stress upon any of the elements. In accordance with the invention therefore, the coupling member is at all times resiliently constrained in a manner which assures maximum operating efficiency under the varying conditions of load and overload, with a minimum of wear upon and distortion of the coacting parts, which tend to reduce the continued peak effectiveness of the device.

In greater detail, reference is made to FIGS. 1 to 7, which illustrate a coupling device in the form of a one-way clutch. The driving member A is in the form of an annular or circular plate. The driving plate may be provided with an integral axially extending, externally threaded hub, as disclosed in my copending application hereinbefore referred to. It is preferred however, for convenience of manufacture and assembly, to use a separate element to provide the externally threaded means 12. For this purpose, the driving plate is provided with a central opening to permit an externally threaded quill shaft 24 (FIG. 6) to be positioned intermediate the driving shaft and the driving plate, as shown. The quill shaft is fixed to the driving shaft for rotation therewith and to prevent its axial movement by a setscrew 26, and the driving plate is fixed for rotation with the quill shaft by a key and keyway arrangement 28. The quill shaft is provided with a collar 30 to furnish the desired thickness and strength of section for the keyway and setscrew connection.

The driving plate is provided with a circumferential rim or flange 32 which extends axially therefrom toward the coupling member B. If desired, the rim may be provided by the coupling member, the purpose thereof being to provide a protective housing for the springs positioned between the driving plate and the coupling member. The rim furnishes an outer cover side for the annular chamber 14. To assist in the positioning the springs in the same plane throughout the various phases of operation of the device, the driving plate may be further provided with a circumferential cavity or depression 34 on its inner face adjacent the rim 32, as shown in detail in FIG. 4.

Figure 3:
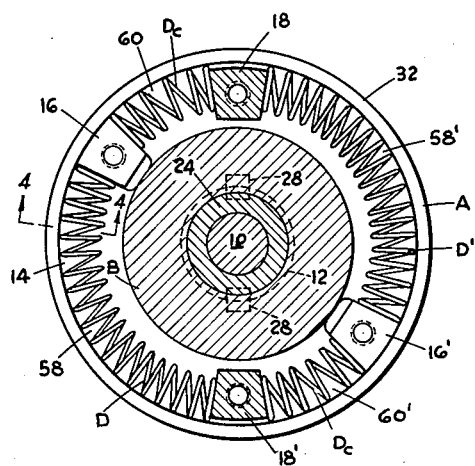
FIG. 3 is a view taken approximately in the plane of line 3—3 of FIG. 1.
Figure 4:
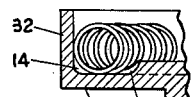
FIG. 4 is a cross-sectional view taken approximately in the plane of line 4—4 of FIG. 3.
Figure 5:
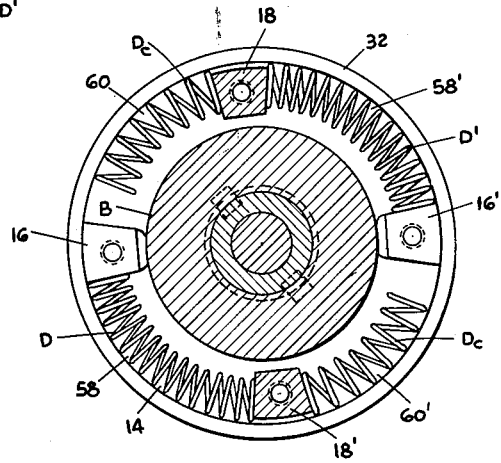
FIG. 5 is a view approximately in the plane of line 5—5 of FIG. 2 showing the relationship of the parts when the clutch is engaged, as compared to the relationship of the parts when the clutch is disengaged as shown in FIG. 3.
Figure 6:
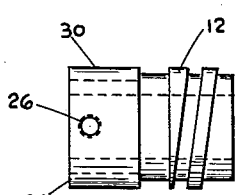
FIG. 6 is a side elevational view of a quill shaft employed in the clutch of FIG. 1 to provide externally threaded means for the mounting thereon of the coupling member.
Figure 7:
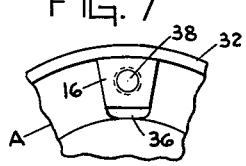
FIG. 7 is a detailed view of a suitable manner for securing an abutment in position upon either the driving member or coupling member components of the coupling device illustrated in the preceding figures.

In the particular embodiment illustrated, and as more clearly shown in FIGS. 3 and 5, the driving plate A is provided with a pair of abutments 16, 16' preferably located at diametrically opposite sides of the plate. The abutments may be formed or cast integrally with the plate. Preferably however, and as shown in FIG. 7, the abutments are formed separately and individually assembled with and secured to the driving plate. This is accomplished by forming a wedge-shaped slot 36 in the inner face of the driving plate for each of the abutments, the abutment being provided with corresponding mating angles at its sides to prevent cocking or rotation of the abutment with respect to the driving plate. The abutments are then each fixed to the plate by a screw 38 extending through a tapped hole in the abutment.

The coupling member B is also preferably in the form of an annular plate, and has a central opening which is internally threaded to furnish the threaded means 12' for mating engagement with the threaded means 12 provided by the quill shaft. The coupling or pressure plate is formed with a stepped portion 40 on its driving plate side to provide a circumferential area of reduced thickness to allow room for the springs. As shown in FIGS. 3 and 5, the coupling plate abutments are also preferably located at diametrically opposite sides of the plate. The abutments may be secured to the coupling plate in the same manner as previously described in connection with the abutments for the driving plate. The opposite or outer face 42 of the coupling plate is adapted for frictional engagement with the axially arranged clutch plate C. The clutch plate is provided with a central hub 44 having a central bore 46 to receive the shaft 20 to be driven. The driven shaft is fixed to the clutch plate by a setscrew 48 extending through the hub and in engagement with a key 50 located within a key-way 52 provided in the driven shaft.

Figure 1:
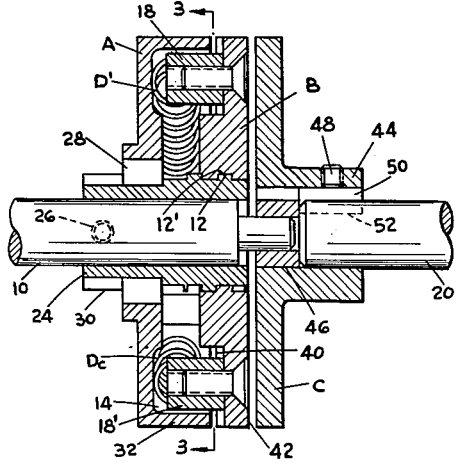
FIG. 1 is a vertical cross-sectional view of a clutch made in accordance with one form of the invention, this view showing the clutch in the disengaged position.
Figure 2:
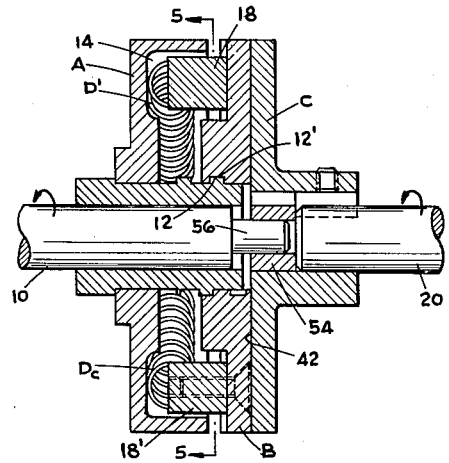
FIG. 2 is a view similar to FIG. 1 showing the clutch in the engaged position.

As shown in FIGS. 1 and 2, to assist in centering the clutch plate with respect to the driving shaft, driving plate and coupling plate assembly, the coupling plate may be provided with a short bushing 54 press-fitted into the bore 46 and against the key 50 to receive a centering pin 56 extending axially from the driving shaft 10. If desired, this arrangement may be reversed with the centering pin provided by the coupling plate and receiving in a bushing secured within the end of the quill shaft 24.

In the one-way clutch shown in FIGS. 1, 2, 3 and 5, a pair of constant diameter helically coiled compression springs D and D' are used to interconnect the coupling plate with the driving plate and the driving shaft. The driving and coupling plates are related to one another in the neutral position of the device so that their respective abutments are circumferentially off-set as shown in FIG. 3 to provide a pair of arcuate segments 58 and 58' in the annular chamber 14 to receive the springs D and D', respectively. The segment 58 has its ends defined by the driving plate and coupling plate abutments 16 and 18'; the segment 58' has its arcuate ends defined by the coupling plate and driving plate abutments 18 and 16'. When the device is in such neutral position, the interconnecting springs D and D' are symmetrically arranged with respect to one another on opposite sides of the chamber 14, with the ends of each spring bearing against a driving plate and coupling plate abutment, respectively. With a pair of springs of equal length, pitch, wire diameter and spring diameter, their symmetrical relationship provides a dynamic balance, and such balance is maintained throughout all phases of operation of the device. In position, the springs may initially be placed under a slight amount of stress or partially compressed to a desired degree.

When the power to be transmitted to the clutch plate C is derived from a driving shaft having a counter clockwise direction of rotation, as indicated by the arrow in FIG. 2, the quill shaft 24 is provided with an opposite or right-hand thread, and the internal thread 12' of the coupling plate is correspondingly threaded. When the shaft 20 is to be rotated clockwise, another quill shaft, or one with a left-hand thread is provided with the illustrated form of coupling device, and the coupling plate is changed to one with a corresponding thread. Regarding the threaded means, its total axial length may be relatively short, for the extent of axial travel of the coupling plate from its fully disengaged to engaged positions need be only a short distance, on the order of 1/32 inch. A thread having a substantial root diameter and of a contour to provide substantial strength, such as an Acme thread, is preferred.

The coupling plate, by virtue of the described mounting thereof, acts in the nature of a traveling nut. When the driving shaft is rotated, and with it the driving plate, the coupling plate is caused to rotate relatively with respect to the driving plate, but because of its inertia, will lag behind the rate of rotation of the driving plate initially. The rotation imparted to the threadedly mounted coupling plate cause it to move in an axial direction until it frictionally engages the clutch plate. During the relative rotation of the driving and coupling plates, the arcuate segments 58, 58' are shortened, causing the inter-connecting springs D and D' therein to be compressed, as shown by a comparison of FIGS. 3 and 5. Upon engagement of the coupling plate with the clutch plate, the coupling plate is constrained against rotation by the load on the clutch plate, temporarily reducing the rate of rotation of the coupling plate. An accelerating force is imparted to the clutch plate by the resiliently mounted, rotating coupling pressure plate, whereupon the driving shaft, driving plate, coupling plate and clutch plate will then rotate together for a period in synchronism. Variations in load cause a proportionate variation in the rate of rotation of the coupling plate. Due to its resilient mounting, the coupling plate automatically adjusts itself into synchronous pressure engagement with the clutch plate.

The described relationship of the interconnecting springs with respect to the driving and coupling plates makes the contact of the coupling plate with the clutch plate practically shockless. The transmission of forces of a character which would distort the threads, upon engagement of the coupling plate with the clutch plate, as well as when the coupling plate must respond to variations in load and overload, is minimized, and thread lock-up is prevented. As indicated in FIG. 5, showing the relationship of the springs and the abutments of the driving and coupling plates when the coupling plate is in engagement with the clutch plate, the interconnecting springs D and D' maintain the same, symmetrical relationship with one another, although now under compression or increased compression, as when the device is in the static or neutral position of FIG. 3. Also, the same balance is maintained during rotation and movement of the coupling plate into and out of engagement with the clutch plate, and when the coupling plate is adjusting itself to variations in load.

When the rotation of the driving shaft 10 is stopped, or its rate of rotation is insufficient to maintain a coupling plate of given mass in engagement with the clutch plate, the coupling plate automatically disengages from the clutch plate and returns axially on its threaded mounting to the position shown in FIG. 1, and the relationship of the parts shown in FIG. 3. The compressed interconnecting springs D and D', reacting on their respective abutments, cause the coupling plate to release and rotate in a direction opposite to its direction of rotation when moving into engagement and while transmitting the power of the driving shaft. In order to off-set the tendency of the coupling plate to over-travel upon its return, and to cushion or buffer the forces supplied by the compressed interconnecting springs, which normally may cause the abutments 16 and 18, and 16' and 18', to strike one another with considerable impact, resilient buffer means, also preferably in the form of helically coiled springs $D_c$ are positioned in the second pair of arcuate segments 60 and 60' between the driving plate and coupling plate abutments 16 and 18, and 16' and 18'. The buffer or cushioning springs each have a free or unstressed length substantially equal to the arcuate length of the segments 60 and 60' when the device is in the fully disengaged position of FIG. 3. When the device is in the fully engaged position, the segments 60 and 60' are lengthened (FIG. 5), and the ends of the cushioning springs are spaced a slight distance from their respective abutments. The circumferential displacement of the abutments of the driving and coupling plates between the extreme positions of engagement and full disengagement of the device involves only a few degrees so that, with the confinement of the springs along its sides within the annular chamber, the slight spacing between the ends of the cushioning springs and the adjacent abutments in the engaged position of the device does not interfere with their effectiveness in cushioning when the compressed interconnecting springs expand to rotate the coupling plate back to neutral position. If desired, resilient means in the form of a rubber pad may be secured to those sides of the abutments which are opposite to the sides which bear against an interconnecting spring.

Figure 10:
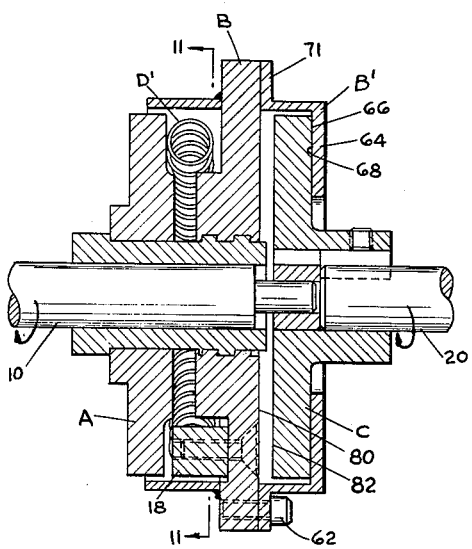
FIG. 10 is a view similar to FIG. 8, but showing the clutch in its engaged position when the driving shaft is rotated in one direction.

FIGS. 8 to 13 illustrate a two-way operable clutch. Although affording the highly desirable two-way operation, the parts thereof, and their relationship with respect to one another are essentially the same as hereinbefore described in connection with the one-way clutch. The driving member A and its axially extending, externally threaded means 12 are the same. The internally threaded coupling member or pressure plate B is mounted on the externally threaded means and related to the driving member in the same manner as previously described. The coupling plate however is made of a larger diameter than the driving plate and the clutch plate to permit a secondary coupling member B' to be secured thereto about its periphery by a plurality of circumferentially spaced bolts 62 extending through the secondary coupling member and into the coupling plate, as shown in FIGS. 8 and 10.

The secondary coupling member B' is dish-shaped in form and has, when secured in position, a radially extending wall 64 providing an inner face 66 for engagement with the rear face 68 of the clutch plate C. The wall 64 is provided with a central opening 70 to allow the hub 44 of the clutch plate to extend therethrough with some clearance. The depth and diameter of the secondary coupling member B' are sufficient to allow the clutch plate C to be received therein with a slight amount of clearance circumferentially and axially. The clearance in an axial direction between the surfaces 66 and 68 is less than the distance the coupling plate may travel to the left from the neutral position shown in FIG. 8 to the engaged position of FIG. 10. Also, the dish-shaped secondary coupling member is provided with an outwardly extending, circumferential flange 71 for securing the part to the coupling plate by the bolts 62. Also, to protectively house the springs within the annular chamber 14 between the driving and coupling plates, it is preferred to provide the latter with an axially extending, circumferential rim or flange 72 on its opposite face. The rim may be welded to the coupling plate.

In this form of the invention, the driving plate and the coupling plate may each be provided with but a single abutment, the abutments 16 and 18, respectively. As shown in FIG. 9, the driving and coupling plates are positionally related to one another so that their abutments are circumferentially off-set 180°. Two helically coiled springs D and D' are positioned in the two segments 74 and 74', respectively, of the annular chamber 14 in a single concentric plane parallel to the plane of the threaded means 12, 12' as previously described. The ends of the springs however, instead of bearing against the abutments in unattached or floating engagement as previously described, are fastened to the abutments. For this purpose, and as shown in FIG. 9, the end of each spring may be secured to the adjoining side of an abutment by a washer 76, which lies over the last spring turn, and a screw 78 which extends through the washer into a tapped hole in the side of the abutment.

With a right-hand thread provided on the quill shaft 24, and the driving shaft rotated clock-wise, in the direction of the arrow as shown in FIG. 10, the coupling plate B will travel from the position shown in FIG. 8 to the left until the face 66 of the secondary coupling member B' engages the face 68 of the clutch plate C. Upon the rotation and axial travel imparted to the coupling plate by the rotation of the driving shaft, the spring D is compressed, as shown by a comparison of FIGS. 9 and 11. This spring would be compressed even if its ends were not fastened to the driving plate and coupling plate abutments. On the other hand, the relative rotation between the driving and coupling plates causes the spring D' to be tensioned, because its ends are secured to those sides of the driving and coupling plate abutments which are moved circumferentially farther apart by the relative rotation of the driving and coupling plates. While the driving shaft 10 continues to rotate to speed, the power is transmitted to the driving shaft 20 through the resilient frictional engagement of the coacting surfaces 66 and 68.

When the rotation of the driving shaft is stopped, the compressed spring D and the tensioned spring D', together and additively, supply their stressed resilient forces to cause the coupling plate to the rotated in the opposite or disengaging direction. The coupling plate thus travels axially to the right from the position of FIG. 10 back to the position shown in FIG. 8, moving the secondary coupling member B' with it, and out of engagement from the clutch plate C. Upon the return travel of the coupling plate, the spring D', which was under tension when the clutch was transmitting power, upon its recoil to its shortened length, is placed in compression after having supplied its additive force to that of compressed spring D to cause the reversed rotation of the coupling plate, and thus acts to cushion the return of the rotating coupling plate to the desired neutral position of static equilibrium, as shown in FIGS. 8 and 9.

Figure 12:
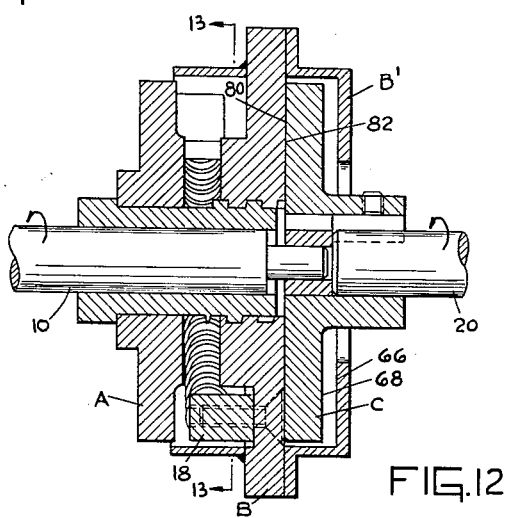
FIG. 12 is a view of the clutch shown in FIG. 8 in its engaged position when the driving shaft is rotated in the direction opposite to the direction of rotation shown in FIG. 10.

To transmit power and rotate the driven shaft 20 in the opposite direction, the driving shaft 10 of the clutch of FIG. 8 is simply rotated in the opposite direction, as indicated by the arrow in FIG. 12, which shows the second engaged position of the clutch. It is unnecessary to change any of the parts, or to provide an opposite thread hand on the quill shaft and on the coupling plate, for the transmission of power in the opposite direction. When the driving shaft is thus rotated counter clock-wise, the coupling plate B is rotated relatively to the driving plate A, and now travels from the neutral position shown in FIG. 8 to the right until its face 80 engages the face 82 of the clutch plate C. As the coupling plate is rotated and travels axially into engagement with the clutch plate, the spring D', which in the clock-wise rotation of the driving shaft was placed under tension, is now compressed, and alternately, tension is applied to the spring D, as shown in FIG. 13. As previously described, the forces of both springs, one in compression and one in tension, interconnect the coupling plate to the driving shaft, through the medium of the driving plate, so that when rotation of the driving shaft is stopped, the forces additively supplied by both springs cause the coupling plate to return from the engaged position shown in FIG. 12 to the fully disengaged and neutral position shown in FIG. 8. The spring D, which had been under tension, will be momentarily compressed, cushion the recoil of compressed spring D', and act to relatively position the parts into their static neutral position, as shown in FIGS. 8 and 9.

It will be understood that while the illustrated embodiment of the two-way clutch as above described has only one pair of springs interposed between a single abutment of the driving plate and a single abutment of the coupling plate, the driving and coupling plates may each be provided with a plurality of abutments circumferentially offset with respect to each other in alternating relationship, with a spring positioned between each pair of abutments respectively provided by the driving plate and the clutch plate. One group of alternately arranged springs will operate together in compression when the driving shaft is rotated in one direction, and in tension when the driving shaft is rotated in the opposite direction. Similarly, the second group of alternately positioned springs will correspondingly be placed in tension and then in compression when the driving shaft is rotated first in one direction and then the other.

Although not as desirable from the standpoint of symmetry and the dynamic balance which such symmetry affords, for clutches of comparatively small rating, the fastening of the ends of the spring to the driving and coupling plate abutments permits the use of only a single spring, instead of a plurality of springs, as above described in connection with the preferred two-way clutch embodiment of the invention. When, for example, the single spring D is used in the showing of FIGS. 8 to 13, the spring will be compressed as shown in FIG. 11 upon the rotation of the driving shaft in the direction shown in FIG. 10. When rotation of the driving shaft is stopped, the compressed spring will recoil and return the coupling plate B to the neutral position of FIG. 8. The spring itself, being fastened at its ends to the driving and coupling plates, will prevent over-travel of the reversely rotating coupling plate. When the driving shaft is oppositely rotated, as shown in FIG. 12, the same spring D will be tensioned as shown in FIG. 13 to interconnect the driving and coupling plates as the coupling plate is maintained in resilient frictional engagement with the clutch plate C. When the rate of rotation of the driving shaft is insufficient to maintain the coupling plate in engagement with the clutch plate, or is stopped, then the tensioned spring D causes the coupling plate to be reversely rotated back to the neutral static position of FIGS. 8 and 9. The end-fastened spring will then be momentarily compressed to act to buffer the tendency of the coupling plate to override its neutral position.

FIGS. 14, 15 and 16 correspond to FIGS. 9, 11 and 13, respectively, and show the relationship of the springs with respect to the driving and coupling plate abutments of a two-way coupling device when the device is in neutral position, in engaged position with the driving shaft rotating in one direction, and in the opposite direction. The showings of FIGS. 9, 11 and 13 and of FIGS. 14, 15 and 16 differ in that in the latter the springs D and D' do not have their ends fastened to the abutments. As a result, when the driving shaft is rotated in one direction to cause the spring D to be compressed (FIG. 15), or the spring D' to be compressed when rotated in the opposite direction (FIG. 16), the other spring, because it is free floating and unattached at its ends, is not placed in tension as previously described in connection with the structure as shown in FIGS. 8 to 13. While the benefit of the additive force supplied by the second spring in tension is not obtained, when one spring is compressed to interconnect the driving and coupling plates in one direction of rotation of the driving shaft, the second spring acts as a cushioning spring upon the return of the coupling plate from its engaged position. In the opposite direction of rotation, the functions of springs are reversed, as shown by a comparison of FIGS. 15 and 16. Thus, the desirable two-way operability is obtained, though this structure does not afford all of the advantages of the device previously illustrated and described. By placing both springs under a slight amount of compression initially, the springs will bear against their adjacent abutments when alternately acting as a cushioning spring. It will also be apparent that the number of paired springs coacting with respective driving and coupling plate abutments may be selected to suit, as previously described.

FIG. 17 illustrates another manner in which the secondary coupling member, designated B", may be related with respect to the coupling member B and the torque-receiving member C. In this form of two-way clutch, the secondary coupling member is mounted upon the clutch plate C, instead of upon the coupling plate B as previously described. The secondary coupling member is secured to the clutch plate about its periphery by the bolts 84 and extends from its inner face 86. The coupling member B" is provided with a central opening 88 to allow rotation of the driving plate, with its abutment 16, and the movement of the abutment 18 of the coupling plate. To furnish the desired protection against the ingress of extraneous material or objects into the annular chamber 14 housing the springs, the coupling plate may be provided with an axially extending, annular flange 90. The flange may be secured to the coupling plate by welding. The secondary coupling member is formed to provide a radially extending wall 92 surrounding the opening 88 for frictional engagement with the corresponding area furnished by the side 94 of the coupling plate, when the driving shaft is rotated in one direction. When the driving shaft is rotated in the opposite direction, the opposite face 96 of the coupling plate will frictionally engage the primary clutch plate C. The relationship and coaction of the parts is otherwise the same as previously described in connection with the two-way clutch shown in FIGS. 8 to 13, or as shown in FIGS. 14 to 16.

While the several coupling devices have been specifically described with relation to clutches, it will be understood that the same structures may be utilized to furnish brakes, it only being necessary to fixedly mount the torque-receiving member against rotation. For a two-way brake the secondary coupling member will be related to the torque-receiving member or to the primary coupling member as described.

It is believed that the advantages of the invention will be apparent from the foregoing detailed description of several preferred embodiments thereof. It will be apparent that various changes may be made without departing from the spirit and scope of the invention as sought to be defined in the following claims.

I claim:

1. A coupling device comprising a driving member adapted for rotation with a driving shaft, externally threaded means extending axially of the driving member and rotatable therewith, a coupling member adapted for frictional engagement with a torque-receiving member and mounted in mating threaded engagement on said externally threaded means in adjacent, parallel relationship with respect to the driving member and providing a chamber between said members, an abutment fixed to and extending axially from the driving member into said chamber, an abutment fixed to and extending axially from the coupling member into said chamber, said abutments being disposed outward radially with respect to said threaded means and on substantially the same diameter, the abutment of one member being circumferentially off-set with respect to the abutment of the other member, and a pair of helically coiled springs in said chamber extending concentrically with respect to said threaded means in a plane substantially parallel thereto, the ends of each spring being respectively engaged by an abutment of each of the driving and coupling members.

2. A coupling device comprising an annular driving plate adapted for rotation with a driving shaft, externally threaded means extending axially of the driving plate and rotatable therewith, an annular coupling plate, adapted for frictional engagement with a torque-receiving member and mounted in mating threaded engagement on said externally threaded means in adjacent, parallel relationship with respect to the driving plate, one of said plates having a circumferential flange extending axially toward the other plate, with one of said plates further formed to provide an annular chamber between said plates, an abutment fixed to and extending axially from the driving plate into said chamber, an abutment fixed to and extending axially from the coupling plate into said chamber, said abutments being disposed outward radially with respect to said threaded means and on substantially the same diameter with the abutment of one plate circumferentially off-set with respect to the abutment of the other plate, and a pair of helically coiled springs in said chamber extending concentrically with respect to said threaded means in a plane substantially parallel thereto, the ends of each spring being respectively engaged by an abutment of each of the driving and coupling plates.

3. A coupling device comprising an annular driving plate adapted for rotation with a driving shaft, externally threaded means extending axially of the driving plate and rotatable therewith, an annular coupling plate adapted for frictional engagement with a torque-receiving member and mounted in mating threaded engagement on said externally threaded means in adjacent, parallel relationship with respect to the driving plate, one of said plates having a circumferential flange extending axially toward the other plate, with one of said plates further formed to provide an annular chamber between said plates, a torque-receiving member axially arranged for engagement by the coupling plate, an abutment fixed to and extending axially from the driving plate into said chamber, an abutment fixed to and extending axially from the coupling plate into said chamber, said abutments being disposed outward radially with respect to said threaded means and on substantially the same diameter with the abutment of one plate circumferentially off-set with respect to the abutment of the other plate, and a pair of helically coiled springs symmetrically arranged in said chamber and extending concentrically with respect to said threaded means in a plane substantially parallel thereto, the ends of each spring being respectively engaged by an abutment of each of the driving and coupling plates, one spring interconnecting the driving and coupling plates and being compressed upon the relative rotation of the driving and coupling plates and axial travel of the coupling plate, the second spring cushioning the return travel of the coupling plate.

4. A coupling device comprising a driving member adapted for rotation with a driving shaft, externally threaded means extending axially of the driving member and rotatable therewith, a coupling member adapted for frictional engagement with a torque-receiving member, and mounted in mating threaded engagement on said externally threaded means in adjacent, parallel relationship with respect to the driving member and providing a chamber between said members, a pair of circumferentially spaced abutments fixed to and extending axially from the driving member into said chamber, a pair of circumferentially spaced abutments fixed to and extending axially from the coupling member into said chamber, said abutments being disposed outward radially with respect to said threaded means and on substantially the same diameter, the abutments of one member being circumferentially off-set with respect to the abutments of the other member, and a plurality of helically coiled springs in said chamber in alternate symmetrical relation extending concentrically with respect to said threaded means in a plane substantially parallel thereto, the ends of each spring being respectively engaged by an abutment of each of the driving and coupling members.

5. A coupling device as set forth in claim 4, wherein resilient means is provided between abutments on the sides thereof opposite the sides engaged by said springs.

6. A coupling device as set forth in claim 4, wherein a second set of helically coiled springs are alternately arranged with respect to the first set of springs.

7. A coupling device comprising an annular driving plate adapted for rotation with a driving shaft, externally threaded means extending axially of the driving plate and rotatable therewith, an annular coupling plate adapted for frictional engagement with a torque-receiving member and, mounted in mating threaded engagement on said externally threaded means in adjacent, parallel relationship with respect to the driving plate, one of said plates having a circumferential flange extending axially toward the other plate, with one of said plates further formed to provide an annular chamber between said plates, a pair of circumferentially spaced abutments fixed to and extending axially from the driving plate into said chamber, a pair of circumferentially spaced abutments fixed to and extending axially from the coupling plate into said chamber, said abutments being disposed outward radially with respect to said threaded means, and on substantially the same diameter, with the abutments of one plate circumferentially off-set with respect to the abutments of the other plate, a plurality of helically coiled springs in said chamber in alternate symmetrical relation extending concentrically with respect to said threaded means in a plane substantially parallel thereto, the ends of each spring being respectively engaged by an abutment of each of the driving and coupling plates, and a second set of helically coiled springs alternately arranged with respect to said first pair of springs.

8. A two-way coupling device comprising a driving member adapted for rotation with a driving shaft, externally threaded means extending axially of the driving member and rotatable therewith, a coupling member mounted in mating threaded engagement on said externally threaded means in adjacent, parallel relationship with respect to the driving member and providing a chamber between said members, a torque-receiving member axially arranged for engagement by the coupling member, one of the last-mentioned members having a secondary coupling member secured thereto, an abutment fixed to and extending axially from the driving member into said chamber, an abutment fixed to and extending axially from the coupling member into said chamber, said abutments being disposed outward radially with respect to said threaded means and on substantially the same diameter, the abutment of one member being circumferentially off-set with respect to the abutment of the other member, and a pair of helically coiled springs in said chamber extending concentrically with respect to said threaded means in a plane substantially parallel thereto, the ends of each spring being respectively engaged by an abutment of each of the driving and coupling members, each spring being alternately compressed upon relative rotation of the driving and coupling members in opposite directions of rotation of the driving member causing axial travel of the coupling member into respective engagement with the torque-receiving and secondary coupling members, the other spring cushioning the return travel of the coupling member to neutral position.

9. A two-way coupling device as set forth in claim 8, wherein the secondary coupling member is secured to the coupling member for movement therewith.

10. A two-way coupling device as set forth in claim 8, wherein the secondary coupling member is secured to the torque-receiving member.

11. A coupling device comprising a driving member adapted for rotation with a driving shaft, externally threaded means extending axially of the driving member and rotatable therewith, a coupling member adapted for engagement with a torque-receiving member and mounted in mating threaded engagement on said externally threaded means in adjacent, parallel relationship with respect to the driving member and providing a chamber between said members, an abutment fixed to and extending axially from the driving member into said chamber, an abutment fixed to and extending axially from the coupling member into said chamber, said abutments being disposed outward radially with respect to said threaded means and on substantially the same diameter, the abutment of one member being circumferentially off-set with respect to the abutment of the other member, and a helically coiled spring in said chamber on an arc extending concentric with respect to said threaded means in a plane substantially parallel thereto, the ends of the spring being secured to an abutment of each of the driving and coupling members, the spring being stressed upon the rotation of the driving member to cause axial travel of the coupling member, the spring cushioning the return travel of the coupling member to neutral position.

12. A two-way coupling device comprising a driving member adapted for rotation with a driving shaft, externally threaded means extending axially of the driving member and rotatable therewith, a coupling member mounted in mating threaded engagement on said externally threaded means in adjacent, parallel relationship with respect to the driving member and providing a chamber between said members, a torque-receiving member axially arranged for engagement by the coupling member, one of the last-mentioned members having a secondary coupling member secured thereto, an abutment fixed to and extending axially from the driving member into said chamber, an abutment fixed to and extending axially from the coupling member into said chamber, said abutments being disposed outward radially with respect to said threaded means and on substantially the same diameter, the abutment of one member being circumferentially off-set with respect to the abutment of the other member, and a helically coiled spring in said chamber extending on an arc concentric with respect to said threaded means in a plane substantially paralled thereto, the ends of the spring being respectively secured to an abutment of each of the driving and coupling members, the spring being alternately compressed and tensioned upon relative rotation of the driving and coupling members in opposite directions of rotation of the driving member causing axial travel of the coupling member into respective engagement with the torque-receiving, and secondary coupling members, the spring cushioning the return travel of the coupling member to neutral position.

13. A two-way clutch comprising an annular driving plate adapted for rotation with a driving shaft, externally threaded means having a smaller diameter than the diameter of the driving plate extending axially of the driving plate and rotatable therewith, an annular coupling plate mounted in mating engagement on said externally threaded means in adjacent, parallel relationship with respect to the driving plate, one of said plates having a circumferential flange extending axially toward the other plate, with one of said plates further formed to provide an annular chamber between said plates, a clutch plate axially arranged for engagement by the coupling plate, one of the last-mentioned plates having a secondary coupling member secured thereto, an abutment fixed to and extending axially from the driving plate into said chamber, an abutment fixed to and extending axially from the coupling plate into said chamber, said abutments being disposed outward radially with respect to said threaded means and on substantially the same diameter, with the abutment of one plate being circumferentially off-set with respect to the abutment of the other plate, and a pair of helically coiled springs symmetrically arranged in said chamber and extending concentrically with respect to said threaded means in a plane substantially parallel thereto, the ends of each spring being respectively engaged by an abutment of each of the driving and coupling plates, each spring being alternately compressed upon relative rotation of the driving and coupling plates in opposite directions of rotation of the driving plate causing axial travel of the coupling plate into respective engagement with the clutch plate and secondary coupling member the other spring cushioning the return travel of the coupling member to neutral position.

14. A two-way clutch as set forth in claim 13, wherein the secondary coupling member is secured to the coupling plate for movement therewith, and comprises a radially extending wall spaced axially from the coupling plate to receive the primary clutch plate therebetween.

15. A two-way clutch as set forth in claim 13, wherein the secondary coupling member is secured to the clutch plate, and comprises a radially extending wall spaced axially from the clutch plate to receive the coupling plate therebetween.

16. A coupling device as set forth in claim 3, wherein the ends of each spring are secured to an abutment of each of the driving and coupling plates.

17. A two-way clutch as set forth in claim 13, wherein the ends of each spring are secured to an abutment of each of the driving and coupling plates.

References Cited in the file of this patent

UNITED STATES PATENTS

| 541,276 | Hill | June 18, 1895 |
| 677,784 | Leilich | July 2, 1901 |
| 1,196,156 | Savidge | Aug. 29, 1916 |
| 1,232,132 | Ward | July 3, 1917 |
| 1,530,961 | Toutee | Mar. 24, 1925 |
| 1,770,419 | McGrath | July 15, 1930 |

FOREIGN PATENTS

| 163,440 | Great Britain | May 13, 1921 |